Patented Sept. 22, 1953

2,653,100

UNITED STATES PATENT OFFICE 2,653,100

PRECOOKED RICE

Charles R. Carman, Park Forest, and Jim E. Allison, Elmhurst, Ill., assignors to Guardite Corporation, a corporation of Delaware No Drawing. Application July 17, 1952,
Serial No. 299,496

10 Claims. (Cl. 99—82)

1

This invention relates to a precooked cereal and a method of preparing the same and particularly to a precooked rice product.

This application is a continuation-in-part of our copending application Serial No. 275,458, filed March 7, 1952, which in turn is a continuation-in-part of our copending application Serial No. 161,744, filed May 12, 1950.

The precooking of cereals is not a new art, but the problem of precooking cereals, drying them and then having them reconstitute rapidly in water without loss of flavor, palatability or granular identity has heretofore not been satisfactorily solved.

The formation of the present product involves the following factors:

1. In order to procure a uniform product, the moisture content of the material should be uniform as between kernels and uniform throughout each kernel. The preferred range is 18% to 26% with approximately 20% to 22% providing the maximum benefits. The uniformity may be obtained as desired, but the tempering method hereinafter described is preferred.

2. The product should be cooked under conditions of uniformity to gelatinize the starch to bring it to a sufficient state of plasticity properly to puff. This uniformity requires the absence of non-condensible gases in the kernels and is readily accomplished by removing the air from the kernels, replacing the air with an atmosphere of steam and then maintaining during the cooking process a bleed or purge line so that any non-condensible gases generated during the cooking or supplied with the cooking steam may be eliminated.

3. When the product is properly cooked and is at the proper moisture content, it is suddenly shot into a vacuum zone causing expansion of the product. The conditions of the resulting explosion should be such as to cause cold setting of the product by bringing it to a low temperature. The temperature should be below about 101° F. and is preferably as low as about 40° F. or lower. The temperature is determined by the vacuum conditions into which the product is fired and the ability to maintain these conditions during the resulting explosion and concomitant expansion of the product. This means that the expansion chamber should have a volume enormously greater than the cooking chamber. In actual practice, this has been of the order of 330 to 1 in volume. The preferred vacuum at the start of the expansion of the product is of the order of 0.1 to 0.2 of an inch of mercury absolute and

2 uniform results have not been obtained above 2 inches. With chambers of the proper relative volumes, however, the pressure may be permitted to ride up somewhat during the explosion although it is preferred to continue evacuation of the expansion chamber during the explosion and to maintain it at as low a pressure as is practicable. When the chambers are of the proper relative volume, the temperature to which the product is cooled is normally determined by the extent of the vacuum at the beginning of the explosion. For example, tests have shown that when rice is exploded from a one cubic foot cooking chamber into a 330 cubic foot expansion chamber maintained at approximately 0.1 of an inch of mercury absolute the rice attained a temperature of approximately 27° F. even though the pressure in the chamber at the end of the puff was approximately 2 inches of mercury absolute which would correspond to a steam temperature of about 101° F. This relationship does not follow unless the volumetric relationships are properly arranged, nor if the product contains non-condensible gases. It is believed that the results follow because of a blast or velocity effect caused by the uniform and sudden passage of the steam outwardly, the degree and speed of which is determined by the first blast of the explosion providing that explosion is free to continue until all of the product has been subjected to it. Because of this fact, the pressure condition in the rice apparently simulates that of the initial vacuum in the chamber, just as an exhaust pipe of a motor will draw in air through a vent pipe even when the pressure within the exhaust pipe is above atmospheric providing gases are moving through the pipe toward the exit.

4. The moisture content, and cooking time, temperature and pressure and the vacuum into which the product is fired are selected to produce a product having a volume from 1⅔ to 3½ times the volume of the original kernels as determined by their cup weights. Put conversely, the specific gravity as determined from cup weights is from 28.5% to 60% of the specific gravity of the original kernels. The preferred cup weights for rice having a 180 gram original weight per cup is from 55 to 85 grams per cup and the best products from a commercial point of view appear to be those between 65 and 75 grams per cup, although on this point tastes may differ. Products above 75 grams cup weight are denser and harder, but less subject to breakage.

In addition to the foregoing, the following should be observed:

(a) The starch is substantially completely gelatinized.

(b) The time-temperature relationships are sufficiently short and low respectively that browning or scorching is avoided and at the same time the product from a nutritional standpoint has a positive protein efficiency whereas previous cooked products have a negative protein efficiency. Likewise, the thiamine content of the product of this invention is relatively very high compared to prior similar products.

The product of this process has a volume from 1⅔ to 3½ times the original kernels. The shape of the original kernels is roughly maintained, although the outer surface of the puffed material is rough. The product is not case hardened so far as can be observed, but is uniform throughout. On cross section, the kernels have a large number of relatively small cavities substantially uniformly distributed throughout the interior. These cavities while by no means spherical, are generally rounded at their protuberances indicating that they were formed by pressure outwards rather than by shrinkage and collapse inwards. The product is capable of ready hydration to form a product resembling ordinary cooked rice without loss of the identity of the kernels and when so hydrated resembles ordinary cooked rice, although its flavor is different from that of ordinary cooked rice or of prior quick-cooking rice products.

The product is not transparent but is translucent, having a milky-white appearance. Under the glass the individual cell walls appear transparent, although not completely clear. Transverse fracture rings frequently occur at spaced intervals along the kernel, from 7 to 10 of these rings being customary but apparently not necessarily formed during the puffing. In fact in many cases, these may be seen in the washed material before cooking.

The present product has been made from rice from various sources. Texas, Louisiana, Arkansas, and California varieties have been employed. Some of the rice has been long grain; other, short grain. Arkansas Riceland brand and Texas Patna brand are examples of the long grain variety. The Patna, however, has a smaller average diameter and is much harder. Texas and Louisiana rices are normally flinty, while Arkansas rices are softer. California rice is normally short and fat grained material. Normally, the Texas Patna rice is milled to 99% purity and conformity, while the other rices are milled to 95% and 96%. The Patna and Riceland products are normally whiter than the others. Quick-cooking products may be made from all these types, but the cooking and puffing procedures may have to be varied in the individual cases depending upon the type of rice and its condition.

To obtain a quick-cooking rice product having uniformly puffed grains and which is a better marketable product, it is preferred to process rice having a moisture content of about 18% to 26% uniformly distributed throughout the individual cells of the rice kernels.

To so condition the rice, it may be placed in water and allowed to stand with occasional agitation. It may also be placed on a screen, spray washed, and then water added to the rice which is allowed to stand for a time with occasional agitation. A third method which appears to be the most satisfactory, is to place the rice on a screen and spray wash with warm water for a period of 1¼ to 3½ minutes depending upon the condition of the rice; then, after draining the excess water from the outer surface of the rice kernels, temper by placing the kernels in a closed container and allow them to stand for a period of time with occasional agitation until a moisture content of from 18% to 26% is uniformly distributed throughout the individual cells of the rice kernels. Generally speaking, this will take from 1 to 1½ hours and the temperature of the rice will rise from about 70° F. to 100° F. as a result of the warm water wash. The rice may be left in the container for 24 hours or longer at room temperature and upon removal from the container has a dry outer surface.

It is preferred to use water at a temperature of from 95° F. to 110° F. when spray washing and the length of time of this washing will vary according to the temperature of the water being employed and the condition of the rice.

Removal of the non-condensible gases from the rice, cooking and puffing are preferably carried out in a puffer of the type disclosed in the Doyle application, Serial No. 125,668, filed November 5, 1949. In such an apparatus a steaming chamber is provided within which the product may be placed. This steaming chamber is connected by a triggered door to an expansion chamber. The expansion chamber is preferably kept at a very low pressure, means being provided to maintain a low pressure during the puffing. The steaming chamber is provided with evacuating means, steaming means and usually with a purge line through which non-condensible gases can be eliminated as well as some condensed steam which is developed during steaming.

The steps of removing the non-condensible gases from the product and cooking may be carried out before introduction into the puffer, but convenience is best served by carrying out the operations in one device. The tempered rice at a temperature of not less than 91° F. is placed in a steam chamber; the pressure in this chamber is reduced to about 1½ inches of mercury absolute or less and held long enough to remove substantially all of the air and other non-condensible gases from the rice kernels, i. e., about two minutes; and then steam is introduced. The atmosphere of steam is maintained until the rice is substantially completely cooked without loss of cellular identity. After cooking has been completed, the rice is fired from a steam pressure substantially above atmospheric in the steam chamber into the expansion chamber which is maintained at about 2 inches of mercury absolute and about 101° F. and preferably 0.1 to 0.2 inch and below about 40° F. so as to expand and cold set the rice kernels. This firing is done by suddenly releasing the triggered door of the expansion chamber and the resulting explosion ejects the rice into the expansion chamber. The rice product is then dried in any number of ways, as by exposing the rice to air or by circulating warm dry air about the expanded rice product.

The cooking-expanding cycles may be varied. The rice may be subjected to a particular steam pressure for a given period of time and then the steam pressure increased to from 35 pounds to 65 pounds gauge and held for a period of time (usually shorter) following which the rice is fired into the evacuated expansion chamber. Better control of the variables and best results in the rice product are obtained by slowly increasing the steam pressure from about 1½ inches of mercury absolute to a final pressure of about 35 pounds to 65 pounds gauge at a uniform rate, sometimes followed by a holding period at the final steam pressure so that the rice is completely cooked without loss of cellular identity. The cooked rice is then fired into the expansion chamber which preferably has a pressure of from 0.2 to 0.1 inch of mercury absolute and a temperature below 40° F.

The actual values of the variables in the cooking-expanding cycles of this method depend upon the condition and type of rice being used, as well as the degree of expansion desired.

It is preferred not to shoot into the expansion chamber from above 65 pounds gauge or from below 35 pounds gauge. At pressures above 65 pounds gauge the rice product clusters and tends to stick to the chamber walls. Below 35 pounds gauge, the rice product lacks uniformity in size and has a slight hardness of texture.

The pressure within the expansion chamber is maintained at a low point by continuing the evacuation during and after the expansion of the rice. Normally, the pressure in this chamber was not permitted to exceed 1½ to 2 inches of mercury absolute. In some instances, we have operated successfully with the residual pressure as high as 3½ to 7 inches of mercury absolute, but in all such instances the pressure was reduced below 1 inch of mercury absolute within a few minutes and before reimposition of atmospheric pressure.

The following examples show cooking times which prove satisfactory:

(1) Texas Patna rice was placed in the steam chamber, the pressure was raised by introducing steam to 10 lbs. gauge during a 10 minute period. The pressure was then raised quickly to 35 lbs. gauge and then fired.

(2) California Pearl rice was steamed quickly to 20 lbs., held there for 20 minutes, steamed quickly to 40 lbs., held there for one minute and fired.

(3) California Pearl rice was steamed quickly to 20 lbs., held there for 7 minutes, steamed quickly to 50 lbs., held there for 15 seconds and fired.

(4) California Pearl rice was steamed quickly to 20 lbs., held there for 7 minutes, steamed quickly to 40 lbs., held there for 30 seconds and fired.

(5) California Pearl rice was steamed quickly to 20 lbs., held there for 20 minutes, and then fired.

(6) California Pearl rice was steamed quickly to 20 lbs., held there for 20 minutes, and then fired.

(7) California Pearl rice was steamed quickly to 20 lbs., held there for 10 minutes, steamed quickly to 40 lbs., held there for 15 seconds and then fired.

(8) California Pearl rice was placed in the steam chamber, pressure raised by steaming to 25 lbs. during 5 min., held there for 1 minute, and then fired.

(9) Arkansas Mandalay rice was placed in the steam chamber, pressure raised by steaming to 30 lbs. in one minute, held there for 10 seconds and then fired.

(10) Arkansas Mandalay rice was placed in the steam chamber, pressure raised by steaming to 30 lbs. in 5 minutes, and then fired.

(11) California Pearl rice was steamed quickly to 30 lbs., held there for 7 minutes, steamed quickly to 40 lbs., held there for 30 seconds and then fired.

(12) California Pearl rice was steamed quickly to 30 lbs., held there for 10 minutes and then fired.

(13) Rice was placed in the steam chamber, pressure raised by steaming to 35 lbs. in 5 minutes, held there for 2 minutes and then fired. This cycle was followed using both Arkansas Riceland and Arkansas Fortuna rice.

(14) Rice was placed in the steam chamber, pressure raised by steaming to 35 lbs. during 5 minutes and then fired. Arkansas Fortuna, Arkansas Riceland, Arkansas Mandalay, Texas Patna and California Pearl rice were each used in this cycle.

(15) Texas Patna rice was placed in the steam chamber, pressure raised by steaming to 35 lbs. during 2½ minutes and then fired.

(16) Arkansas Mandalay rice was placed in the steam chamber, pressure raised by steaming to 35 lbs. during 1 minute, held there for ten seconds and then fired.

(17) Arkansas Mandalay rice was placed in the steam chamber, pressure raised by steaming to 35 lbs. during 5 minutes, held there for 3 minutes and then fired.

(18) California Pearl rice was placed in the steam chamber, pressure raised by steaming to 35 lbs. during 5 minutes, held there for 30 seconds and then fired.

(19) Rice was placed in the steam chamber, pressure raised to 35 lbs. during 5 minutes, held there for 1 minute and then fired. This cycle was used on Arkansas Mandalay rice and California Pearl rice.

(20) Rice was placed in the steam chamber, pressure raised to 35 lbs. during 5 minutes, held there for 1½ minutes and then fired. This cycle was used on Arkansas Mandalay rice and California Pearl rice.

(21) Arkansas Riceland rice was placed in the steam chamber, pressure raised to 40 lbs. during 5 minutes, held there for 2 minutes and then fired.

(22) Rice was placed in the steam chamber, pressure raised to 40 lbs. during 5 minutes, and then fired. This cycle was used on Arkansas Riceland, Arkansas Mandalay, Texas Patna and California Pearl rice.

(23) Arkansas Mandalay rice was placed in the steam chamber, pressure raised by steaming to 40 lbs. during 1 minute, held there for 10 seconds and then fired.

(24) California Pearl rice was placed in the steam chamber, pressure raised by steaming to 40 lbs. during 5 minutes, held there for 30 seconds and then fired.

(25) California Pearl rice was placed in the steam chamber, pressure raised by steaming to 40 lbs. during 5 minutes, held there for 1 minute and then fired.

(26) California Pearl rice was placed in the steam chamber, pressure raised by steaming to 40 lbs. during 5 minutes, held there for 1½ minutes and then fired.

(27) California Pearl rice was steamed quickly to 40 lbs., held there for 5 minutes and 15 seconds and then fired.

(28) California Pearl rice was steamed quickly to 40 lbs., held there for 10 minutes and 15 seconds and then fired.

(29) California Pearl rice was steamed quickly to 40 lbs., held there for 6 minutes and then fired.

(30) Rice was steamed quickly to 40 lbs., held there for 7 minutes and then fired. Arkansas Riceland and California Pearl rice were used.

(31) California Pearl rice was steamed quickly to 40 lbs., held there for 9 minutes and then fired.

(32) California Pearl rice was steamed quickly to 40 lbs., held there for 8 minutes and then fired.

(33) Texas Patna rice was placed in the steam chamber, pressure raised by steaming to 45 lbs. during 5 minutes, held there for 2 minutes and then fired.

(34) Rice was placed in the steam chamber, pressure raised by steaming to 45 lbs. during 5 minutes, and then fired. Arkansas Riceland, Arkansas Fortuna, Arkansas Mandalay and Texas Patna rices were used.

(35) California Pearl rice was placed in the steam chamber, pressure raised by steaming to 45 lbs. during 5 minutes, held there for 1 minute and then fired.

(36) California Pearl rice was steamed quickly to 45 lbs., held there for 7 minutes and then fired.

(37) California Pearl rice was steamed quickly to 45 lbs., held there for 11 minutes and then fired.

(38) Rice was placed in the steam chamber, pressure raised by steaming to 50 lbs. during 5 minutes, held there for 1 minute and then fired. California Pearl and Texas Patna rice were used.

(39) California Pearl rice was placed in the steam chamber, pressure raised by steaming to 50 lbs. during 5 minutes, held there for 2 minutes and then fired.

(40) California Pearl rice was steamed quickly to 50 lbs., held there for 5 minutes and 15 seconds and then fired.

(41) California Pearl rice was steamed quickly to 50 lbs., held there for 6 minutes and then fired.

The resulting product, as already stated, has a specific gravity approximately 28.5% to 60% that of the original material. For example, Texas Patna rice before processing has a weight of 180 grams per cup, and after processing, about 60 grams per cup.

When the rice prepared in the manner described is boiled for five minutes, as compared to prior quick-cooking materials, the prior materials acquire a slight gluey appearance and texture, whereas the present product does not acquire such an objectionable appearance or texture. When tested in an amylograph, as compared to a prior quick-cooking rice, the present product when used at 50 grams per 450 ml. showed considerably higher results for the present product up to 90° C., with a complete reversal, however, at 96° C. The curve for the present product was steady, but for the prior product had a change of from between 90° C. and 96° C., indicating a lack of complete gelatinization.

A number of runs were made to determine the average rate of hydration of the quick-cooking rice product of this invention. For each run the hydration determinations were made in duplicate using 180 gram samples. One sample of each run was placed in a double boiler containing one quart (946 grams) maintained at about 200° F. (±10° F.). After 5, 15, and 20 minute intervals the water-rice mixture was poured into a strainer while substantially all of the free water passed into the measuring cup in from 10 to 20 seconds. After weighing the free water, it and the rice were again placed in the double boiler. The difference in weight between the free water in the double boiler just prior to placing the rice sample therein and the weight of free water at each interval was the amount of water absorbed by the rice for that particular period of time. The absorbed moisture of the second sample of each run was determined in the same manner except that the hydration determinations were made at 10, 20 and 30 minute intervals.

It was found that water was absorbed by the present quick-cooking rice product at an average rate of 22% of the original dry weight per minute after 4 minutes, and for the next 10 minutes. The deviations from this hydration rate were +6% to −2%. When compared with the hydration rate of prior quick-cooking rice, the product of this invention rehydrates in one-half the time.

When tested for protein efficiency, the present rice product has a 50% efficiency whereas the prior product had a negative protein efficiency. This indicates that the present product has a great deal of nutritional value.

An important property of the precooked rice product of this invention is the large amount of thiamine which is retained. The table below shows the results of three determinations of the thiamine content of the precooked rice of this invention as compared with the thiamine content of the raw rice and that of a prior quick-cooking rice.

*Table*

|  | Thiamine Content, Milligrams per 100 grams | | |
|---|---|---|---|
| Raw Texas Patna Rice | 0.0817 | 0.0693 | 0.095 |
| Precooked Texas Patna Rice-Product of this Invention | 0.0174 | 0.0276 | 0.030 |
| Prior Quick-cooking Rice | 0.0070 | 0.0095 | |

It is readily seen that the quick-cooking rice product of this invention retains at least one-third and up to two-thirds of the original thiamine content of the original rice. On the other hand, prior quick-cooking rice only retains from 5½ to 14% of the original thiamine content.

The rice product previously described is normally cooked by mixing from ¾ to 1 cup of cold water with one cup of rice, adding salt to taste and then bringing quickly to a boil while uncovered. If the cup weight of the material is 60 to 70 grams, ¾ cup of water is used per cup of rice; from 70 to 85 grams, ⅞ cup of water; and above 85 grams, 1 cup of water. The product is then fluffed lightly once or twice with a fork, but not stirred, and is then covered and removed from the heat and allowed to stand for ten minutes before serving.

The foregoing detailed description is given for clearness of understanding only and no unnecessary limitations should be understood therefrom as modifications will be obvious to those skilled in the art.

We claim:

1. The method of producing a quick-cooking rice which comprises cooking the rice in an atmosphere of steam substantially free from air, the steam pressure being increased during the cooking and then, when the product has been substantially completely gelatinized, bringing the pressure to at least about 35 pounds gauge, and instantaneously reducing the pressure by shooting the product into a vacuum zone having an initial pressure close to zero inches of mercury absolute while continuing to evacuate the vacuum zone during the shooting and until cold setting of the product occurs to avoid any substantial pressure in the vacuum zone, the pressure at the time of shooting and the pressure in the vacuum zone being correlated to produce an increase in volume of from five-thirds to five-halves of the original volume of the rice.

2. The method of claim 1 in which the pressure at the time of shooting is in the neighborhood of 55 pounds gauge.

3. The method of claim 1 in which the pressure in the vacuum zone is not permitted to exceed 2 inches of mercury absolute during the shooting and until cold setting of the product occurs.

4. The method of claim 1 in which before cooking, the rice is evacuated to cause boiling of water from the rice and the boiling and evacuation are continued until the evolved vapors have removed substantially all of the air from the rice.

5. The method of treating rice kernels having a moisture content of 18–26% uniformly distributed therethrough which comprises removing the air from the rice kernels and substituting an atmosphere of steam, adding steam thereto at increased pressure and temperature to raise the moisture content thereof and cook the rice, and then instantaneously reducing the pressure from at least 35 pounds gauge well below atmospheric to cause an explosion resulting in expansion of the rice bringing the temperature of the rice below about 101° F. during the explosion and until cold setting of the product occurs, the moisture content of the rice, the rate and time of cooking, the pressure at the inception of the explosion and the extent of the pressure reduction being correlated to produce a product having a specific gravity between about 28.5% and 60% of the original rice kernels, said product being characterized by a translucent, milky-white appearance having a rough outer surface of substantially the shape of the original kernel and capable of ready hydration to individual kernels having the palatable character of ordinary cooked rice.

6. The method as set forth in claim 5 in which the pressure at the inception of the explosion is from 35 pounds to 65 pounds gauge and the instantaneous pressure reduction is to 2 inches of mercury absolute or less.

7. The method as set forth in claim 5 in which the temperature of the product during the explosion is below about 40° F. and the instantaneous pressure reduction is to not more than 0.2 inch of mercury absolute.

8. The method as set forth in claim 5 in which the rice kernels are sprayed with warm water and then tempered to a moisture content of 18–26% uniformly distributed throughout the rice kernels prior to removing air therefrom.

9. The method of treating rice kernels which comprises tempering the kernels with water to a moisture content of 18–26% uniformly distributed therethrough, removing non-condensible gases from the kernels and substituting an atmosphere of steam, slowly increasing the steam pressure at a uniform rate to between 35 pounds and 65 pounds gauge to completely cook the rice, and then instantaneously reducing the pressure to about 0.2 inch mercury absolute to cause an explosion resulting in expansion of the kernels, bringing the temperature of the rice to less than 40° F. during the explosion, and maintaining a reduced pressure sufficient to cold set the expanded rice kernels until cold setting of the kernels occurs.

10. A cold set vacuum-expanded quick-cooking rice product, said product being substantially gelatizined; characterized by a translucent milky-white appearance and a rough outer surface substantially free of case hardening and of substantially the shape of the original rice kernel but substantially enlarged in size to have a specific gravity of about 28.5% to 60% of the original rice; having numerous small cavities substantially uniformly distributed throughout the interior of the product, said cavities being generally rounded at their protuberances; and capable of absorbing water at a temperature of about 200° F. at an average rate of at least about 20% of the dry weight of the original rice per minute for a period of about 10 minutes after immersion in said water for about 4 minutes, the product being capable of ready hydration to individual kernels having the soft, palatable character of ordinary cooked rice.

CHARLES R. CARMAN.
JIM E. ALLISON.

References Cited in the file of this patent

UNITED STATES PATENTS

| Number | Name | Date |
|---|---|---|
| 1,933,158 | Bohn | Oct. 31, 1933 |
| 2,278,464 | Musher | Apr. 7, 1942 |
| 2,438,939 | Ozai-Durrani | Apr. 6, 1948 |
| 2,539,999 | Huzenlaub et al. | Jan. 30, 1951 |
| 2,555,235 | Huzenlaub et al. | May 29, 1951 |

FOREIGN PATENTS

| Number | Country | Date |
|---|---|---|
| 579,981 | Great Britain | Aug. 22, 1946 |